United States Patent
Athlur et al.

(10) Patent No.: US 11,005,821 B2
(45) Date of Patent: May 11, 2021

(54) SERVER FOR DETECTING A PROXY DEVICE IN A COMMUNICATIONS PATH AND RELATED METHODS

(71) Applicant: CITRIX SYSTEMS, INC., Ft. Lauderdale, FL (US)

(72) Inventors: Anudeep Athlur, Karnataka (IN); Praveen Raja Dhanabalan, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 317 days.

(21) Appl. No.: 16/242,613

(22) Filed: Jan. 8, 2019

(65) Prior Publication Data

US 2020/0220863 A1 Jul. 9, 2020

(51) Int. Cl.
*H04L 29/06* (2006.01)
*H04L 9/06* (2006.01)
*H04L 9/00* (2006.01)

(52) U.S. Cl.
CPC .......... *H04L 63/0281* (2013.01); *H04L 9/006* (2013.01); *H04L 9/0643* (2013.01); *H04L 63/06* (2013.01); *H04L 63/083* (2013.01); *H04L 63/0823* (2013.01); *H04L 63/0892* (2013.01)

(58) Field of Classification Search
None
See application file for complete search history.

(56) References Cited

U.S. PATENT DOCUMENTS

| | | | |
|---|---|---|---|
| 5,784,463 A | 7/1998 | Chen et al. | |
| 2004/0019786 A1 | 1/2004 | Zorn et al. | |
| 2004/0243703 A1* | 12/2004 | Demmer | H04L 29/06 709/224 |
| 2009/0028336 A1* | 1/2009 | Goodman | H04L 63/06 380/277 |
| 2010/0042838 A1 | 2/2010 | Ho | |
| 2014/0331297 A1 | 11/2014 | Innes et al. | |
| 2019/0028440 A1* | 1/2019 | Eriksson | H04L 63/0281 |

OTHER PUBLICATIONS

Anonymous "Challenge-response authentication—Wikipedia" Oct. 5, 2018 (Oct. 5, 2018), URL:https://en.wikipedia.org/w/index.php?title=Challengeresponse_authentication&oldid=862590467; pp. 4.

* cited by examiner

*Primary Examiner* — Benjamin E Lanier
(74) *Attorney, Agent, or Firm* — Allen, Dyer, Doppelt + Gilchrist, P.A.

(57) ABSTRACT

A server for detecting a proxy device in a communications path may include a processor and a memory associated therewith. The processor may obtain an encrypted first portion of an encryption key from the client device. The encryption key may be based upon user-input credentials for a given user. The processor may also communicate an encrypted second portion of the encryption key to the client device based upon determining that the encrypted first portion matches a corresponding first portion of the encryption key indicative of an absence of the proxy device in the communications path. The processor may also detect a loss in connectivity between the server and the client device in response to the client device determining that the decrypted second portion of the encryption key does not match a corresponding second portion of the encryption key indicative of a proxy device in the communications path.

20 Claims, 8 Drawing Sheets

SERVER FOR DETECTING A PROXY DEVICE IN A COMMUNICATIONS PATH AND RELATED METHODS

TECHNICAL FIELD

The present application is directed to the field of networking and computer communications, and more particularly, to detecting proxy devices and related methods.

BACKGROUND

A proxy device is a device that acts as an intermediary for requests from client devices seeking resources from a server. Typically, a client device connects to the proxy device, requesting a service or process. The proxy device may modify the request for increased efficiency, for example. The proxy device may also provide anonymity while accessing content, for example.

Typically, in an application, a server is validated by the client device based upon secure sockets layer (SSL) server certificates. The client device may validate a SSL server certificate and authorizes itself to the server using client authentication. The client device may authorize itself to the server based upon user credentials, for example.

SUMMARY

A server for detecting a proxy device in a communications path may include a processor and a memory associated therewith. The processor may be configured to obtain an encrypted first portion of an encryption key from a client device, the encryption key based upon user-input credentials for a given user from among a plurality of users, and communicate an encrypted second portion of the encryption key to the client device based upon determining that the encrypted first portion matches a corresponding first portion of the encryption key indicative of an absence of the proxy device in the communications path. The processor may also be configured to detect a loss in connectivity between the server and the client device via the communications path in response to the client device determining that the decrypted second portion of the encryption key does not match a corresponding second portion of the encryption key indicative of a proxy device in the communications path.

The processor may be configured to terminate communications with the client device based upon determining that the encrypted first portion does not match the corresponding first portion of the encryption key indicative of the proxy device in the communications path. The processor may be configured to decrypt the encrypted first portion based upon reference user credentials for the given user, and encrypt the second portion of the encryption key based upon the reference user credentials, for example.

The processor may be configured to communicate the encrypted second portion of the encryption key to the client device based upon determining that decrypted data representative of the encrypted first portion matches the corresponding first portion of the encryption key. The decrypted data that may be representative of the encrypted first portion is obtained from an authentication server, for example. The user-input credentials include a username and a password, for example.

A method aspect is directed to a method of detecting a proxy device in a communications path. The method may include using a server to obtain an encrypted first portion of an encryption key from a client device. The method may also include using the server to communicate an encrypted second portion of the encryption key to the client device based upon determining that the encrypted first portion matches a corresponding first portion of the encryption key indicative of an absence of the proxy device in the communications path. The method may also include using the server to detect a loss in connectivity between the server and the client device via the communications path in response to the client device determining that the decrypted second portion of the encryption key does not match a corresponding second portion of the encryption key indicative of a proxy device in the communications path.

A computer readable medium aspect is directed to a non-transitory computer readable medium for detecting a proxy device in a communications path. The non-transitory computer readable medium includes computer executable instructions that when executed by a processor cause the processor to perform operations. The operations may include obtaining an encrypted first portion of an encryption key from a client device. The operations also include communicating an encrypted second portion of the encryption key to the client device based upon determining that the encrypted first portion matches a corresponding first portion of the encryption key indicative of an absence of the proxy device in the communications path. The operations also include detecting a loss in connectivity between the server and the client device via the communications path in response to the client device determining that the decrypted second portion of the encryption key does not match a corresponding second portion of the encryption key indicative of a proxy device in the communications path.

DETAILED DESCRIPTION

Figure 1:
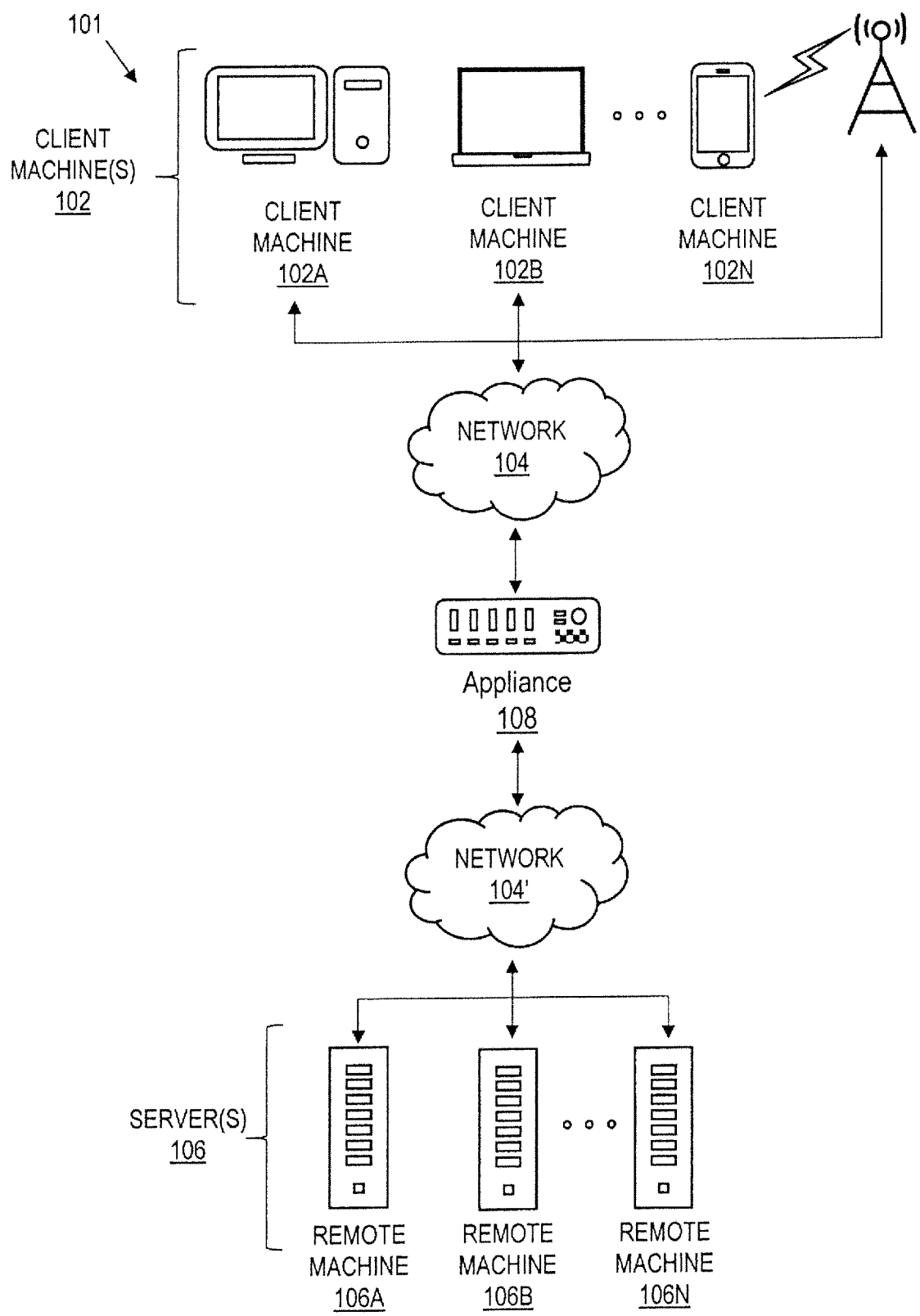
FIG. 1 is a schematic block diagram of a network environment of computing devices in which various aspects of the disclosure may be implemented.

The present description is made with reference to the accompanying drawings, in which example embodiments are shown. However, many different embodiments may be used, and thus the description should not be construed as limited to the particular embodiments set forth herein. Like numbers refer to like elements throughout, and base 100 reference numerals are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Referring initially to FIG. 1, a non-limiting network environment 101 (i.e. a communication system) in which various aspects of the disclosure may be implemented includes one or more client machines 102a-102n, one or more remote machines 106a-106n, one or more networks 104a, 104b, and one or more appliances 108 installed within the computing environment 101. The client machines 102a-102n communicate with the remote machines 106a-106n via the networks 104a, 104b.

In some embodiments, the client machines 102a-102n communicate with the remote machines 106a-106n via an intermediary appliance 108. The illustrated appliance 108 is positioned between the networks 104a, 104b and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104a and/or 104b.

The client machines 102a-102n may be generally referred to as client machines 102, local machines 102, clients 102, client nodes 102, client computers 102, client devices 102, computing devices 102, endpoints 102, or endpoint nodes 102. The remote machines 106a-106n may be generally referred to as servers 106 or a server farm 106. In some embodiments, a client device 102 may have the capacity to function as both a client node seeking access to resources provided by a server 106 and as a server 106 providing access to hosted resources for other client devices 102a-102n. The networks 104a, 104' may be generally referred to as a network 104a. The networks 104a may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102. In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104a may be: a local-area network (LAN); a metropolitan area network (MAN); a wide area network (WAN); a primary public network 104a; and a primary private network 104a. Additional embodiments may include a network 104a of mobile telephone networks that use various protocols to communicate among mobile devices. For short range communications within a wireless local-area network (WLAN), the protocols may include IEEE 802.11, Bluetooth, and Near Field Communication (NFC).

Figure 2:
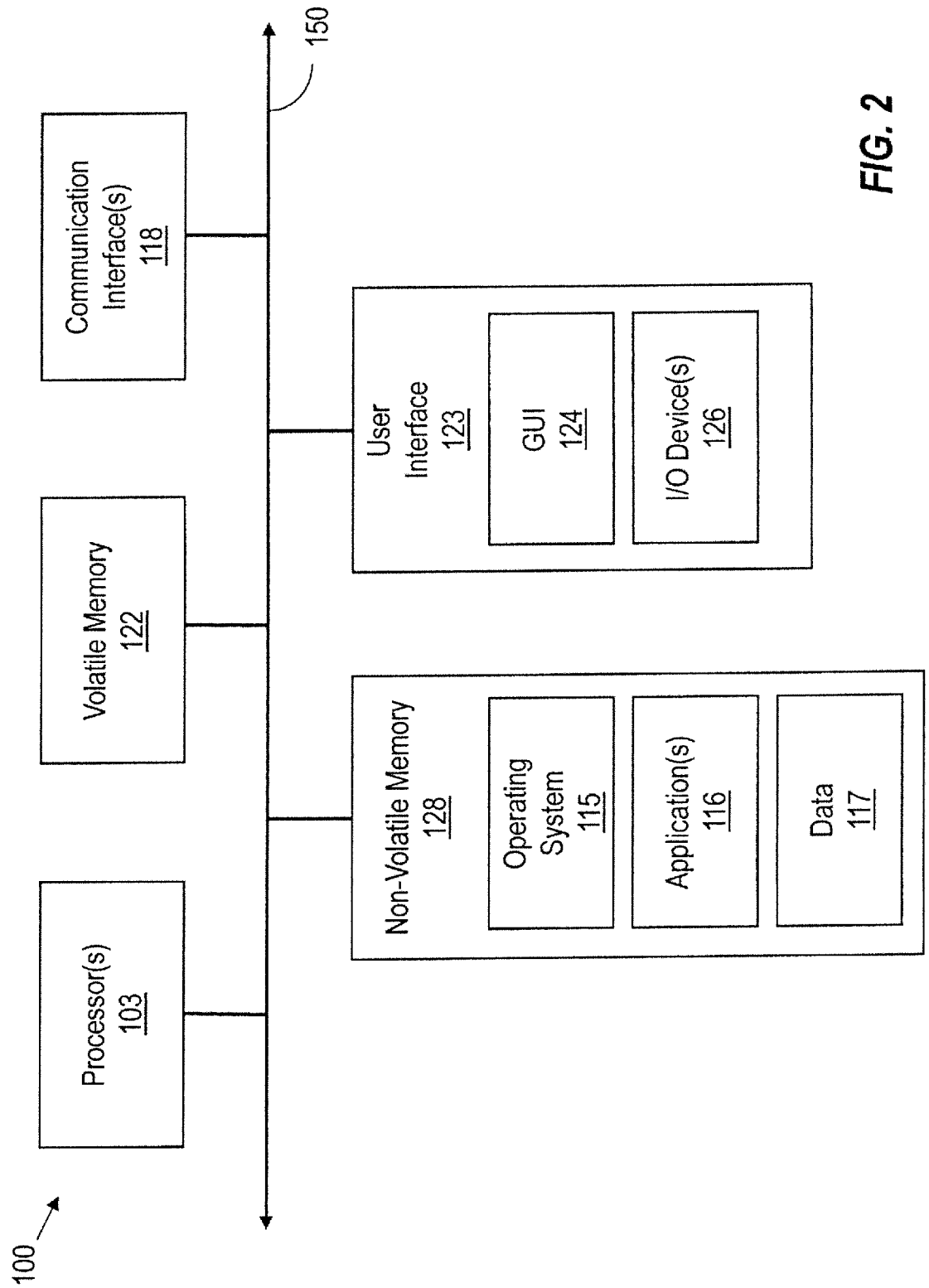
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150. The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
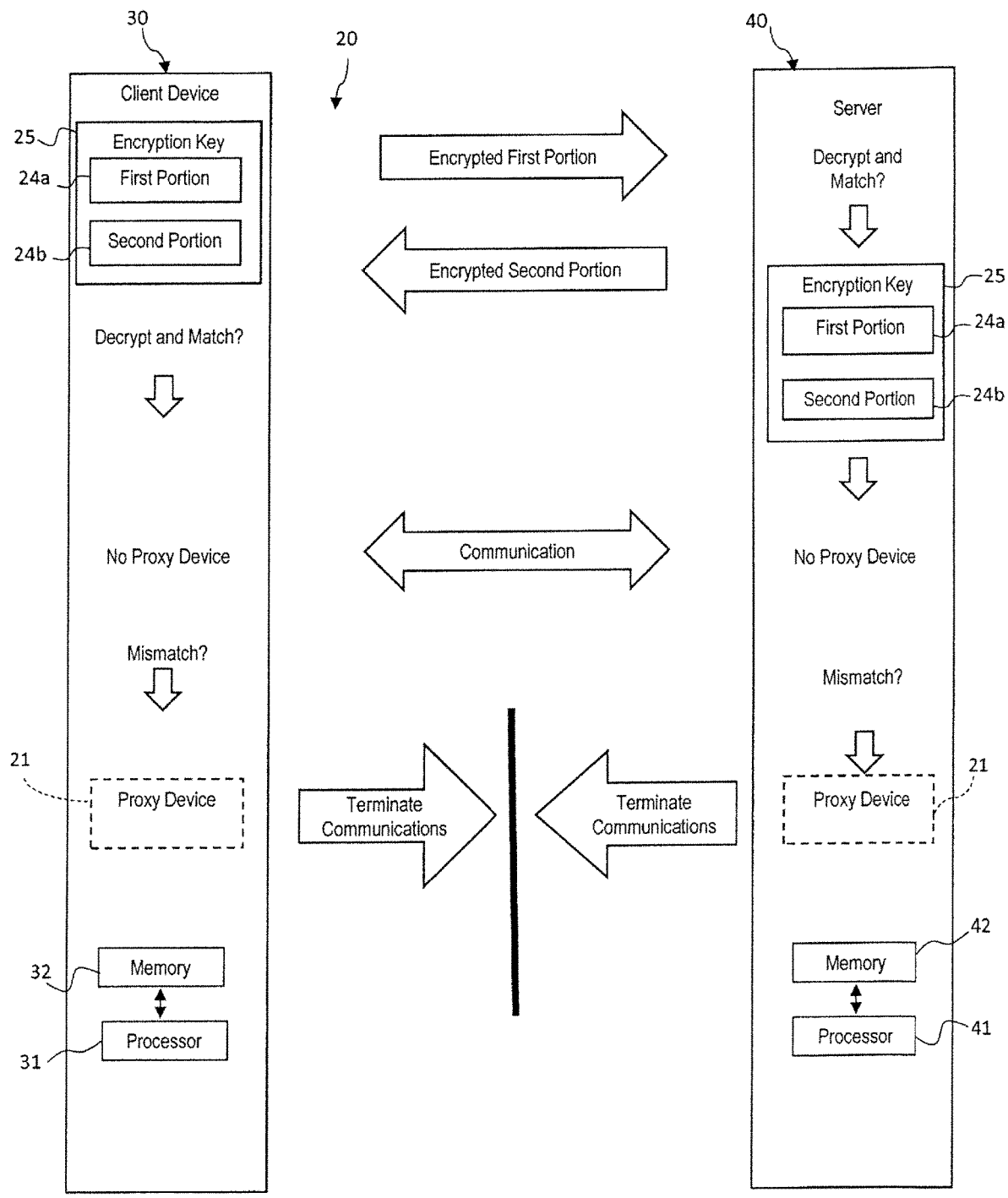
FIG. 3 is a schematic operational diagram of a system for detecting a proxy device in accordance with an embodiment.

Referring now to FIG. 3, a proxy device 21 may spoof authorization of a client device 30 to a server 40, for example, based upon the user credentials. In some instances, a notification of a proxy device may be provided. However, the notification may be ignored and connection to the proxy device may be permitted. More particularly, those skilled in the art will appreciate that a proxy device 21 between or in the communication of a client device 30 and a server 40 may permit an attacker to spoof the data including the username and password of the client if, for example, a user overlooks certificate authority (CA) validation failure security alerts (e.g., user-provided manual override), the client device 30 trusts an insecure CA (e.g., whose private key is stolen), the client device is compromised, and injected with a hacker CA certificate, and/or a revoked certificate is ignored by the client device (e.g., server A uses certificate C at time A, but later revokes certificate C, but the client device blindly trusts the certificate C).

Thus, a system 20, as described herein, including both the client device 30 and server 40, may advantageously detect the presence of an SSL proxy device 21 from the server (and client device), so that an insecure connection to a client device can be restricted or prevented, for example, even before the authentication process. Moreover, the system 20 may provide more robust security, and double encryption may be avoided. For example, if a determination is made that there is no proxy device 21 in the communications path or channel, only SSL may suffice. In other words, the use of an additional encryption technique, for example, Kerberos, may be not be desirable. By not using any additional encryption techniques, a load on the server 40 may be reduced. As such, the systems and methods set forth herein advantageously provide improved performance within a virtualized and/or enterprise environment.

Those skilled in the art may appreciate that the proxy device 21 is not part of the system 20, and may be any computer, server, and/or other device or devices in the communications path that acts as an intermediary for requests from the client device 30 to a server 40. The proxy device 21 may be a secure sockets layer (SSL) proxy device, for example.

The client device 30 may be a desktop computer, mobile device or other type of device. The client device 30 includes a processor 31 and a memory 32 coupled to the processor 31. While operations of the client device 30 are described herein, it will be appreciated by those skilled in the art that the operations are performed through cooperation between the processor 31 and the memory 32.

The system 20 also includes a server 40 that is communicatively coupled to the client device 30 by way of the communications path. The server 40 provides a service or performs a function on behalf of the client device 30. The server 40 includes a processor 41 and a memory 42 coupled to the processor. Similarly to the client device 30, while operations are described with respect to the server 40, the operations are performed through cooperation between the processor 41 and the memory 42. Those skilled in the art will appreciate that the communications path may include a network, part of a network, or multiple networks. Moreover, during communications, it may be particularly desirable that the communications path be clear of undesirable computers, such as, for example, undesirable proxy devices.

The client device 30 operates an application, for example, and obtains user-input credentials for a given user from among a plurality of users. Those skilled in the art will appreciate that an application may be a computer program designed to help people perform an activity. An application thus differs from an operating system (which runs a computer), a utility (which performs maintenance or general-purpose chores), and a programming tool (with which computer programs are created). Depending on the activity for which it was designed, an application can manipulate text, numbers, audio, graphics, or a combination of these elements. Some applications may focus on a single task, such as word processing. An application may be a mobile application. An application may perform a group of coordinated functions, tasks, or activities for the benefit of the user. Examples of an application include a word processor, a spreadsheet, an accounting application, a web browser, a media player, an aeronautical flight simulator, a console game or a photo editor.

The user-input credentials may include a username and a corresponding password for each given user, for example. The user-input credentials may include other and/or additional credentials or types of credentials (e.g., personal identification numbers, biometric identifiers). The user-input credentials may be used to access the server 40, for example, to authenticate the user to the server (e.g., a remote desktop, email, remote workspace, etc.).

Figure 4:
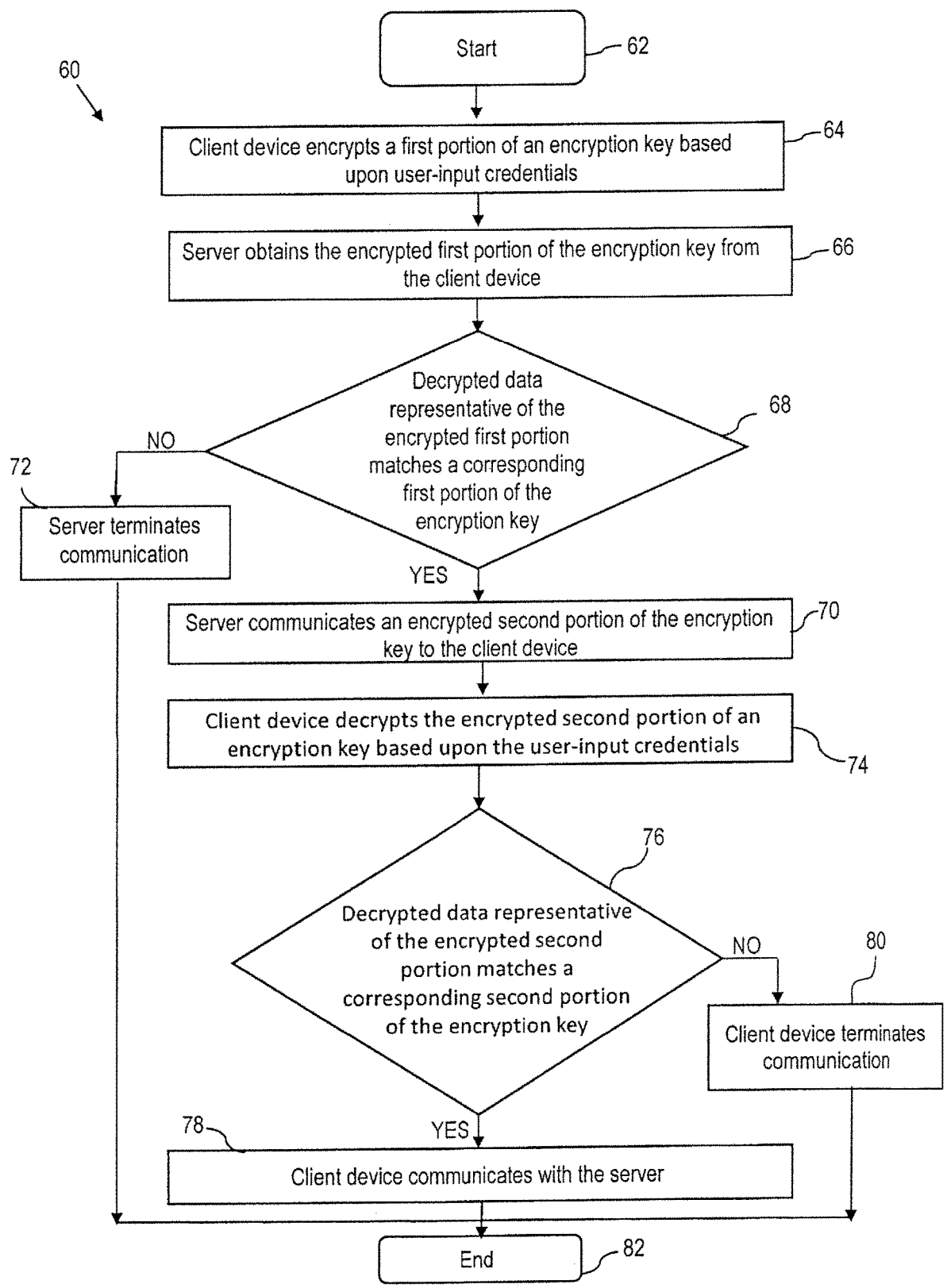
FIG. 4 is a flow diagram illustrating operation of the system of FIG. 3.

Referring now additionally to the flowchart 60 in FIG. 4, beginning at Block 62, operations of the client device 30 and server 40 with respect to detecting the proxy device 21 will now be described.

At Block 64, the client device 30 encrypts a first portion 24a of an encryption key 25 based upon the user-input credentials. An encryption key is a piece of information (a parameter) that determines the functional output of a cryptographic algorithm. For encryption algorithms, a key specifies the transformation of plaintext into ciphertext, and vice versa for decryption algorithms. An encryption key may also specify transformations in other cryptographic algorithms, such as digital signature schemes and message authentication codes.

More particularly, the client device 30 may encrypt the first portion 24a of the encryption key 25 based upon the password (i.e., the password is used as a basis or key for the encryption). The first portion 24a of the encryption key 25 may be encrypted based upon other and/or additional user-input credentials.

At Block 66, the server 40 obtains the encrypted first portion 24a of the encryption key 25 from the client device 30. The server 40, at Block 68, determines the encrypted first portion 24a matches a corresponding first portion of the encryption key 25. If at Block 68 there is a match, indicative of an absence of the proxy device 21 in the communications path, the server 40 communicates an encrypted second portion 24b of the encryption key 25 to the client device 30 (Block 70). Otherwise, if there is not a match or a mismatch at Block 68, the server 40 terminates communication (e.g., and/or detecting a loss in connectivity), for example, with the client device 30, as the mismatch may be indicative of the proxy device 21 in the communications path (Block 72) (e.g., closing ports, sending a termination command).

At Block 74, the client device 30 decrypts the encrypted second portion 24b of the encryption key 25 based upon the user-input credentials. At Block 76, the client device 30 determines whether there is a match between the decrypted second portion 24b of the encryption key 25 and a corresponding second portion of the encryption key (e.g., by comparison). If, at Block 76, there is a match between the decrypted second portion 24b of the encryption key 25 and a corresponding second portion of the encryption key, which may be indicative that the proxy device 21 being absent from the communications path, the client device 30 communicates with the server 40 (Block 78) (e.g., the server 40 and client device 30 may communicate more securely as a proxy may pose an increased security risk by potentially allowing a data breach). Otherwise, if there is a mismatch at Block 76, the client device 30 terminates communications with the server 30 (Block 80) (e.g., closing ports, sending a termination command), as the mismatch may be indicative of the proxy device 21 being in the communications path. In the present embodiments, a proxy device 21 in the communications path is not desired as this may be considered a security risk. The operations end at Block 82.

Figure 5A:
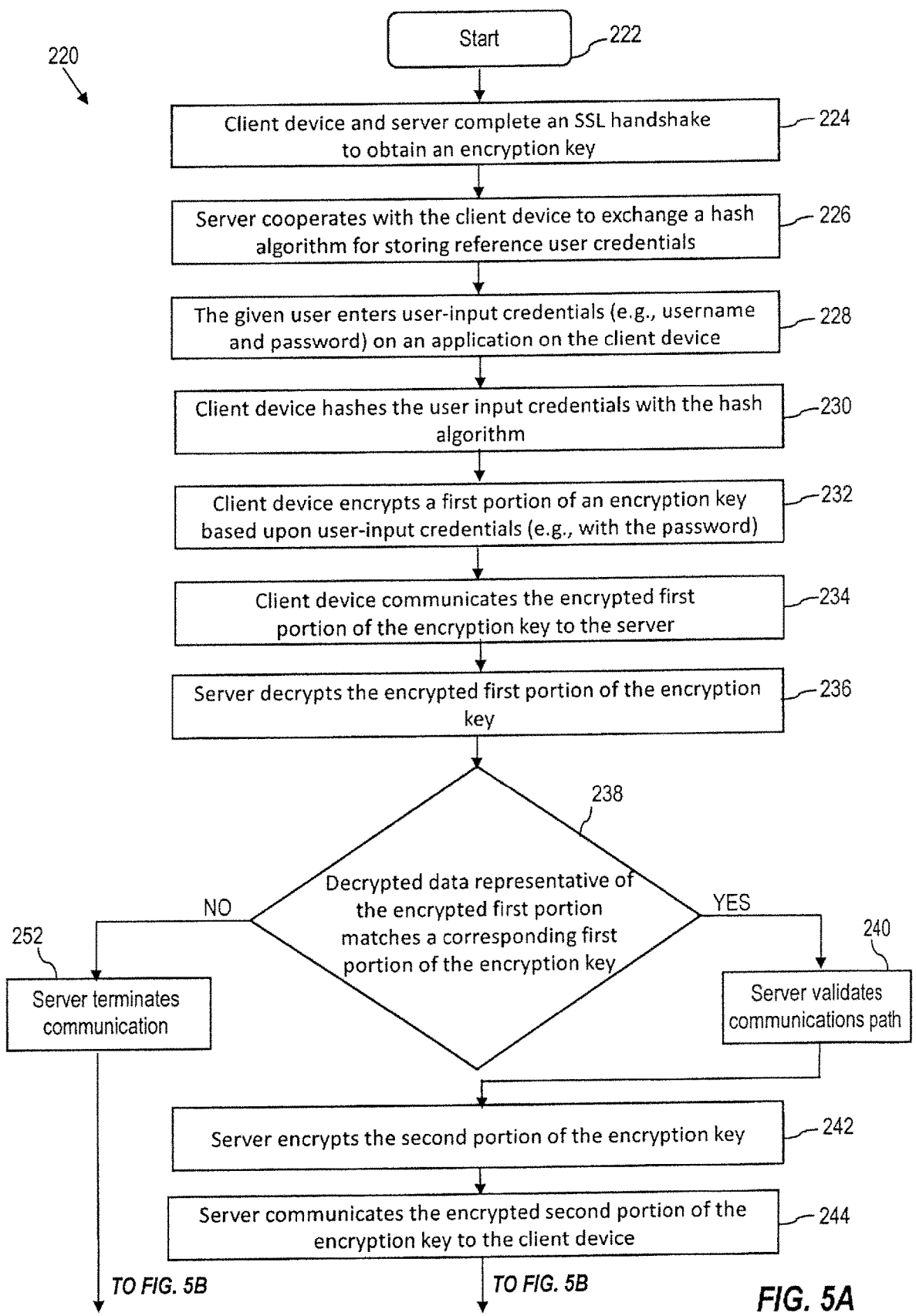
FIG. 5A is a portion of a more detailed flow diagram illustrating operation of a system for detecting a proxy device in accordance with an embodiment.
Figure 5B:
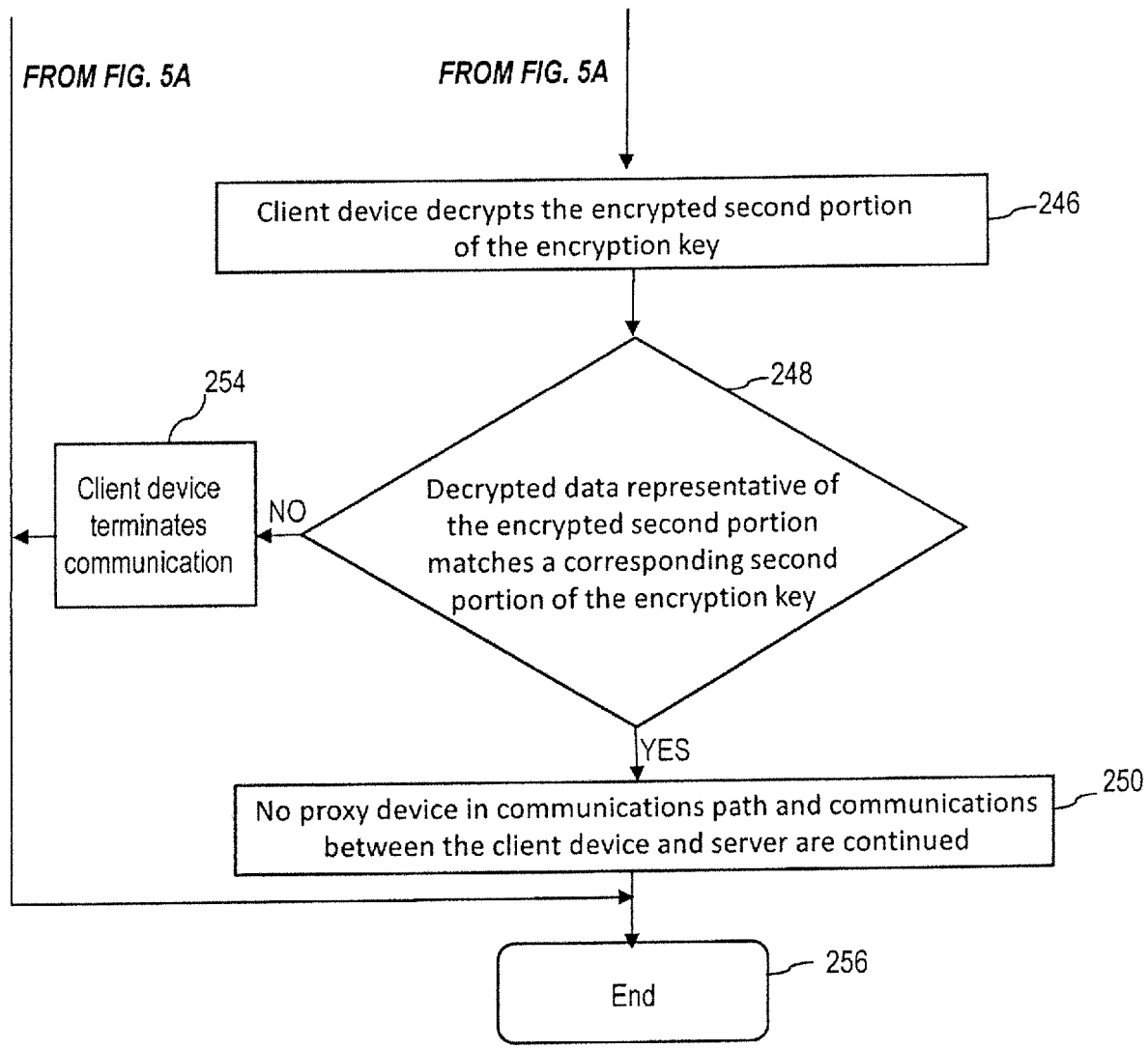
FIG. 5B is another portion of the flow diagram of FIG. 5A.

Referring now additionally to the flowchart 220 in FIGS. 5A-5B, beginning at Block 222, more detailed operations of the client device 30 and server 40 with respect to an embodiment of detecting the proxy device 21 will now be described.

At Block 224, the client device 30 and the server 40 complete an SSL handshake (i.e., initial communications between the client device and the server to establish a connection therebetween), for example, using the public key infrastructure (PKI) to obtain an encryption key 25 (e.g., a symmetrical encryption key (master key)). PKI is a set of roles, policies, and procedures needed to create, manage, distribute, use, store & revoke digital certificates and manage public-key encryption. The purpose of a PKI is to facilitate the secure electronic transfer of information for a range of network activities such as e-commerce, internet banking and confidential email.

Figure 6:
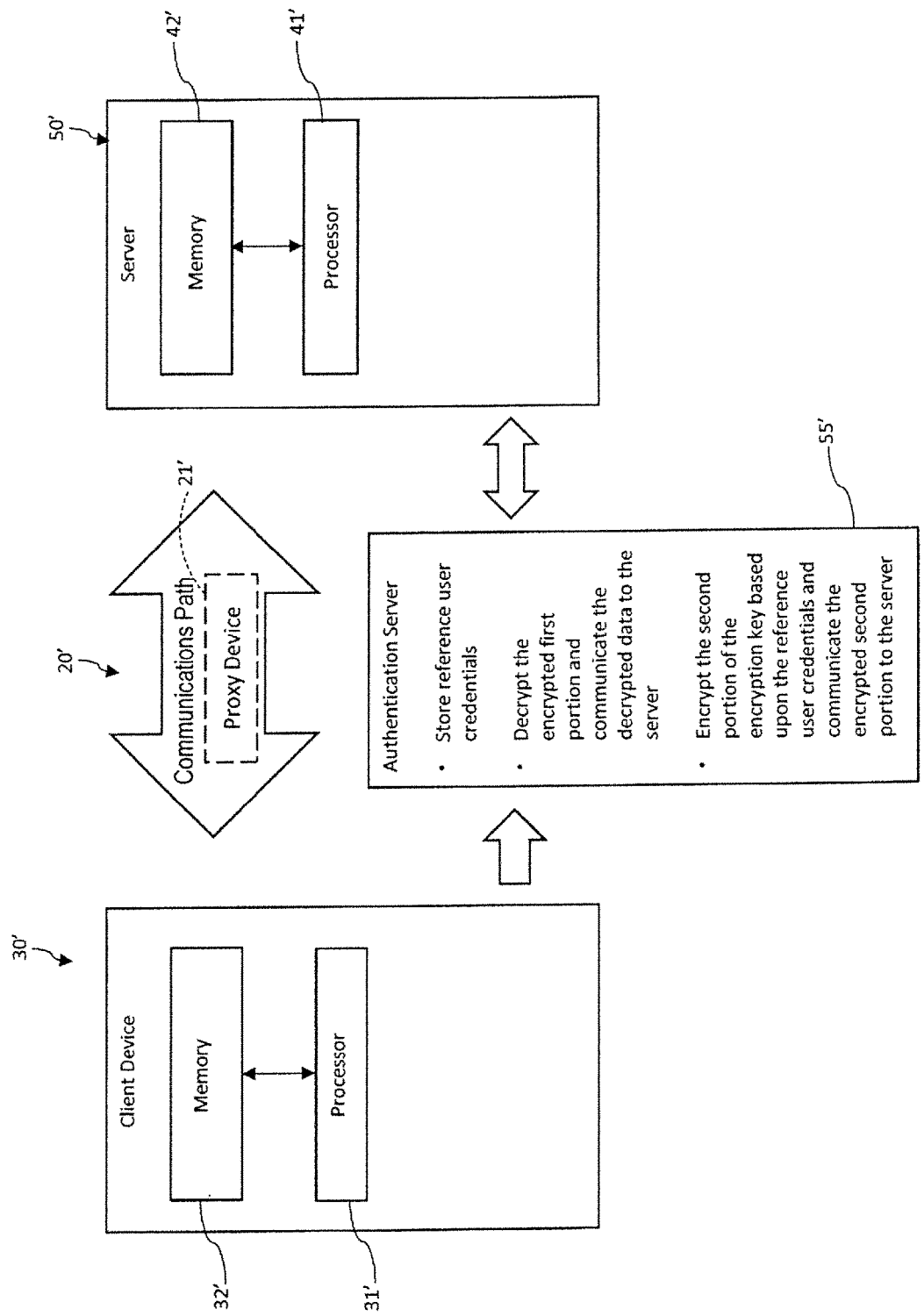
FIG. 6 is a schematic block diagram of a system for detecting a proxy device in accordance with another embodiment.

The server 40, at Block 226, cooperates with the client device 30 to exchange a hash algorithm or other function that can be used to map data, if any is used, for storing the user credentials as reference credentials (e.g., the user's password). The server 40 may store the reference user credentials locally in the memory 42, or, referring briefly to FIG. 6, in a third party authentication system or server 55'. In some embodiments, a hash algorithm may not be used or exchanged.

At Block 228, the given user enters (e.g., manually) the username and password on the application on the client device 30. If a hash algorithm is exchanged, the client device 30 hashes the user input credentials (e.g., password) with the hash algorithm (Block 230). It should be noted that the username and password (i.e., user provided credentials) are not typically communicated, because if there was a proxy device 21, the username, password, and other sensitive data may be revealed.

At Block 232, the client device 30 encrypts a first portion 24a, for example, a first half, of the encryption key 25 and the username with the user-input credentials or password. The client device 30 communicates the encrypted first portion 24a of the encryption key 25 to the server 40 (Block 234). For example, the client device 30 may wirelessly communicate a segment of the encryption key less than the entire encryption key via wireless communications circuitry. In other embodiments, the first portion 24a may be another sized portion of the encryption key 25, for example, any amount less than the entire encryption key. The server 40, if local authentication is used (i.e., not an authentication server), decrypts the encrypted first portion 24a of the encryption key 25, as it has a local copy (i.e., stored in memory 42) of user credentials (reference credentials) the password or the password hash, for example (Block 236), as described above.

Referring again briefly to FIG. 6, if a third-party authentication server 55' is used, the encrypted data from the client device 30' is forwarded to the authentication server 55', which in turn decrypts the encrypted data using the password or hash of the given user, and sends the decrypted data to the server 40'.

Referring again to FIGS. 5A and 5B, if the decrypted data matches the corresponding first portion (e.g., first half) of the encryption or master key 25 (Block 238), the server 40 validates that the channel or communications path between itself and the client device 30 is secure and hence, that there is no proxy device 21 (Block 240). If at Block 238, the decrypted data does not match the corresponding first portion (e.g., first half) of the encryption or master key 25, which is indicative of the proxy device 21 being in the communications path, the server 40 terminates communications with the client device 30 (Block 252) (e.g., and/or detecting a loss in connectivity). More particularly, if there is a proxy device 21 in the communications path, the encryption key 25 encrypted on the client device 30 will not match on the server 40, as the encrypted key will be that of the proxy device rather than the server, and the server takes steps to block this connection (e.g., not permit communications with the proxy device based upon its device identification), which may include requesting that the client device reset the password. This is because, in such a scenario where there is a proxy device in the communications path, the password on the client device 30 would have been used to encrypt a well-known master or encryption key 25 of the proxy device 21, and thus, the possibility for the proxy device to reverse engineer the password would be relatively high.

The server 40, at Block 242 encrypts the second portion 24b (e.g., second half or other portion size, which may be, when combined with the first portion 24a, less than the entire encryption key) of the encryption or master key 25. More particularly, if local authentication (i.e., authentication at the server 40) is used, the server 40 performs the encryption using a local copy of the password or the password hash (e.g., reference user credentials).

The server 40 forwards the encrypted second portion 24b of the encryption key 25 to the client device 30 (Block 244). The client device 30, knowing the password or its hash, decrypts the encrypted second portion 24b of the encryption key 25 (Block 246) (e.g., uses the previously generated key) determines if the second portion 24b received from the server 40 is valid based upon a matching operation (Block 248). If at Block 248 there is a match, both the server 40 and client device 30 establish that the connection or communications path therebetween does not include the proxy device 21 and continue communications therebetween (Block 250). If, at Block 248, the second portions do not match, communications between the server 40 and the client device 30 are terminated (Block 254) (e.g., closing ports, sending a termination command). Operations end at Block 256. It should be noted that the above communications between the server 40 and the client device 30 may occur over a secure SSL communications path or channel which is itself free of a proxy device 21.

Referring again briefly to FIG. 6, if a third-party authentication server 55' is used (instead of local authentication as described above), the server 40' passes the data or second portion 24b of the encryption key 25 to the third party authentication server 55' which in turn encrypts the second portion of the encryption key using the reference user credentials or password or hash of the given user, and sends back the encrypted data or encrypted second portion of the encryption key to the server.

Figure 7:
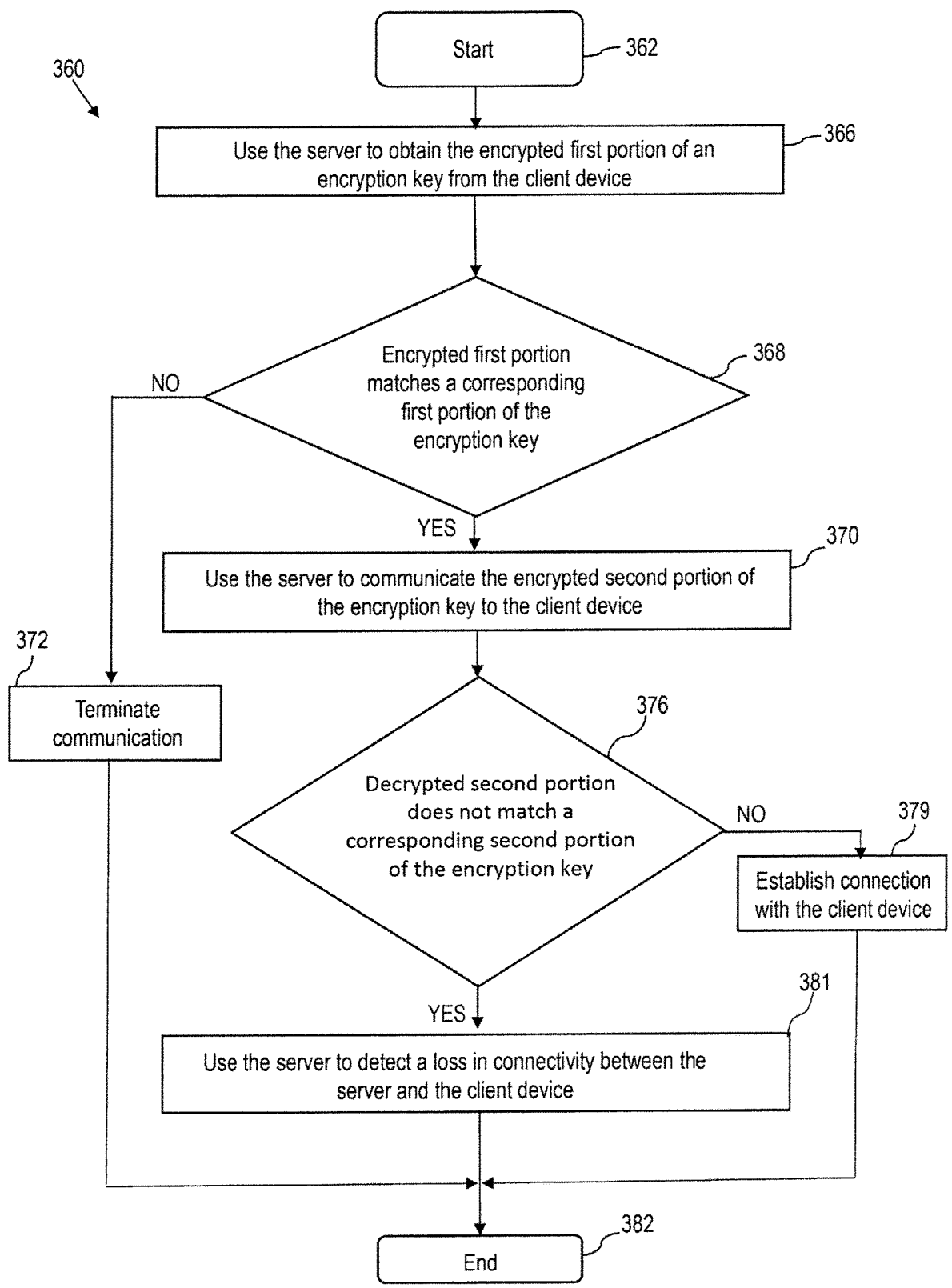
FIG. 7 is a flow diagram illustrating operation of a system for detecting a proxy device in accordance with an embodiment.

Referring now to the flowchart 360 in FIG. 7, beginning at Block 362, a method aspect is directed to a method of detecting a proxy device 21 in a communications path. The method includes using a server 40 to obtain an encrypted first portion 24a of an encryption key 25 from a client device 30 (Block 366). The method also includes using the server 40 to communicate an encrypted second portion 24b of the encryption key 25 to the client device 30 (Block 370) based upon determining that the encrypted first portion matches a corresponding first portion 24a of the encryption key 25 indicative of an absence of the proxy device 21 in the communications path (Block 368). If the encrypted first portion does not match a corresponding first portion of the encryption key (Block 368), the server 40 terminates communication (Block 372). The method may also include using the server 40 to detect a loss in connectivity between the server 40 and the client device 30 via the communications path (Block 381) in response to the client device 30 determining that the decrypted second portion of the encryption key 25 does not match a corresponding second portion of the encryption key 25 indicative of a proxy device 21 in the communications path (Block 376). If, at Block 376, the decrypted second portion does not match a corresponding second portion of the encryption key, the server 40 establishes a connection or communications with the client device 30 (Block 379). Operations end at Block 382.

A computer readable medium aspect is directed to a non-transitory computer readable medium for detecting a proxy device 21 in a communications path. The non-transitory computer readable medium includes computer executable instructions that when executed by a processor 41 cause the processor 41 to perform operations. The operations may include obtaining an encrypted first portion 24a of an encryption key 25 from a client device 30. The operations also include communicating an encrypted second portion 24b of the encryption key 25 to the client device 30 based upon determining that the encrypted first portion matches a corresponding first portion of the encryption key 25 indicative of an absence of the proxy device 21 in the communications path. The operations also include detecting a loss in connectivity between the server 40 and the client device 30 via the communications path in response to the client device 30 determining that the decrypted second portion of the encryption key 25 does not match a corresponding second portion of the encryption key indicative a proxy device 21 in the communications path.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A server for detecting a proxy device in a communications path, the server comprising:
   a processor and a memory associated therewith, the processor configured to
      obtain an encrypted first portion of an encryption key from a client device, the encryption key based upon user-input credentials for a given user from among a plurality of users, and
      communicate an encrypted second portion of the encryption key to the client device based upon determining that the encrypted first portion matches a corresponding first portion of the encryption key indicative of an absence of the proxy device in the communications path, and
      detect a loss in connectivity between the server and the client device via the communications path in response to the client device determining that the decrypted second portion of the encryption key does not match a corresponding second portion of the encryption key indicative of a proxy device in the communications path.

2. The server of claim 1 wherein the processor is configured to terminate communications with the client device based upon determining that the encrypted first portion does not match the corresponding first portion of the encryption key indicative of the proxy device in the communications path.

3. The server of claim 1 wherein the processor is configured to decrypt the encrypted first portion based upon reference user credentials for the given user, and encrypt the second portion of the encryption key based upon the reference user credentials.

4. The server of claim 1 wherein the processor is configured to communicate the encrypted second portion of the encryption key to the client device based upon determining that decrypted data representative of the encrypted first portion matches the corresponding first portion of the encryption key.

5. The server of claim 4 wherein the decrypted data representative of the encrypted first portion is obtained from an authentication server.

6. The server of claim 1 wherein the user-input credentials comprise a username and a password.

7. A client device for detecting a proxy device in a communications path, the client device comprising:
a processor and an associated memory, the processor configured to
encrypt a first portion of an encryption key based upon user-input credentials for a given user from among the plurality of users,
decrypt an encrypted second portion of an encryption key based upon the user-input credentials received from a server in connection with the client device, the encrypted second portion indicates an absence of the proxy device in a communications path between the client device and the server based on the encrypted second portion corresponding to the encrypted second portion of the encryption key, and
disconnect the communications path between the client device and the server in response to determining that the decrypted second portion of the encryption key does not match the corresponding second portion of the encryption key indicative of a proxy device in the communications path.

8. The client device of claim 7 wherein the processor is configured to terminate communications with the server based upon determining that the decrypted second portion of the encryption key does not match the corresponding second portion of the encryption key indicative of the proxy device in the communications path.

9. The client device of claim 7 wherein the processor is configured to hash the user-input credentials based upon a hash algorithm.

10. The client device of claim 7 wherein the user-input credentials comprise a username and a password.

11. The client device of claim 7 wherein the processor is configured to encrypt a first portion of the encryption key based upon the password.

12. The client device of claim 7 wherein the encrypted second portion is communicated from a server configured to obtain the encrypted first portion of the encryption key from the client device and communicate the encrypted second portion of the encryption key to the client device.

13. A method of detecting a proxy device in a communications path, the method comprising
using a server to
obtain an encrypted first portion of an encryption key from a client device,
communicate an encrypted second portion of the encryption key to the client device based upon determining that the encrypted first portion matches a corresponding first portion of the encryption key indicative of an absence of the proxy device in the communications path, and
detect a loss in connectivity between the server and the client device via the communications path in response to the client device determining that the decrypted second portion of the encryption key does not match a corresponding second portion of the encryption key indicative of a proxy device in the communications path.

14. The method of claim 13 wherein using the server comprises using the server to terminate communications with the client device based upon determining that decrypted data representative of the encrypted first portion does not match the corresponding first portion of the encryption key, the mismatch being indicative of the proxy device in the communications path.

15. The method of claim 13 wherein using the server comprises using the server to decrypt the data representative of the encrypted first portion based upon reference user credentials for the given user, and encrypt the second portion of the encryption key based upon the reference user credentials.

16. The method of claim 13 wherein using the server comprises using the server to decrypt the encrypted first portion based upon reference user credentials for the given user, and encrypt the second portion of the encryption key based upon the reference user credentials.

17. The method of claim 13 wherein using the server comprises using the server to communicate the encrypted second portion of the encryption key to the client device based upon determining that decrypted data representative of the encrypted first portion matches the corresponding first portion of the encryption key.

18. A non-transitory computer readable medium for detecting a proxy device in a communications path, the non-transitory computer readable medium comprising computer executable instructions that when executed by a processor cause the processor to perform operations, the operations comprising:
obtaining an encrypted first portion of an encryption key from a client device;
communicating an encrypted second portion of the encryption key to the client device based upon determining that the encrypted first portion matches a corresponding first portion of the encryption key indicative of an absence of the proxy device in the communications path; and
detecting a loss in connectivity between the server and the client device via the communications path in response to the client device determining that the decrypted second portion of the encryption key does not match a corresponding second portion of the encryption key indicative of a proxy device in the communications path.

19. The non-transitory computer readable medium of claim 18 wherein the operations comprise terminating communications with the client device based upon determining that decrypted data representative of the encrypted first portion does not match the corresponding first portion of the encryption key, the mismatch being indicative of the proxy device in the communications path.

20. The non-transitory computer readable medium of claim 18 wherein the operations comprise decrypting the data representative of the encrypted first portion based upon reference user credentials for the given user, and encrypt the second portion of the encryption key based upon the reference user credentials.

* * * * *